March 3, 1936. T. V. BUCKWALTER 2,032,466
LOCOMOTIVE ROD BEARING
Filed June 1, 1931 2 Sheets-Sheet 1
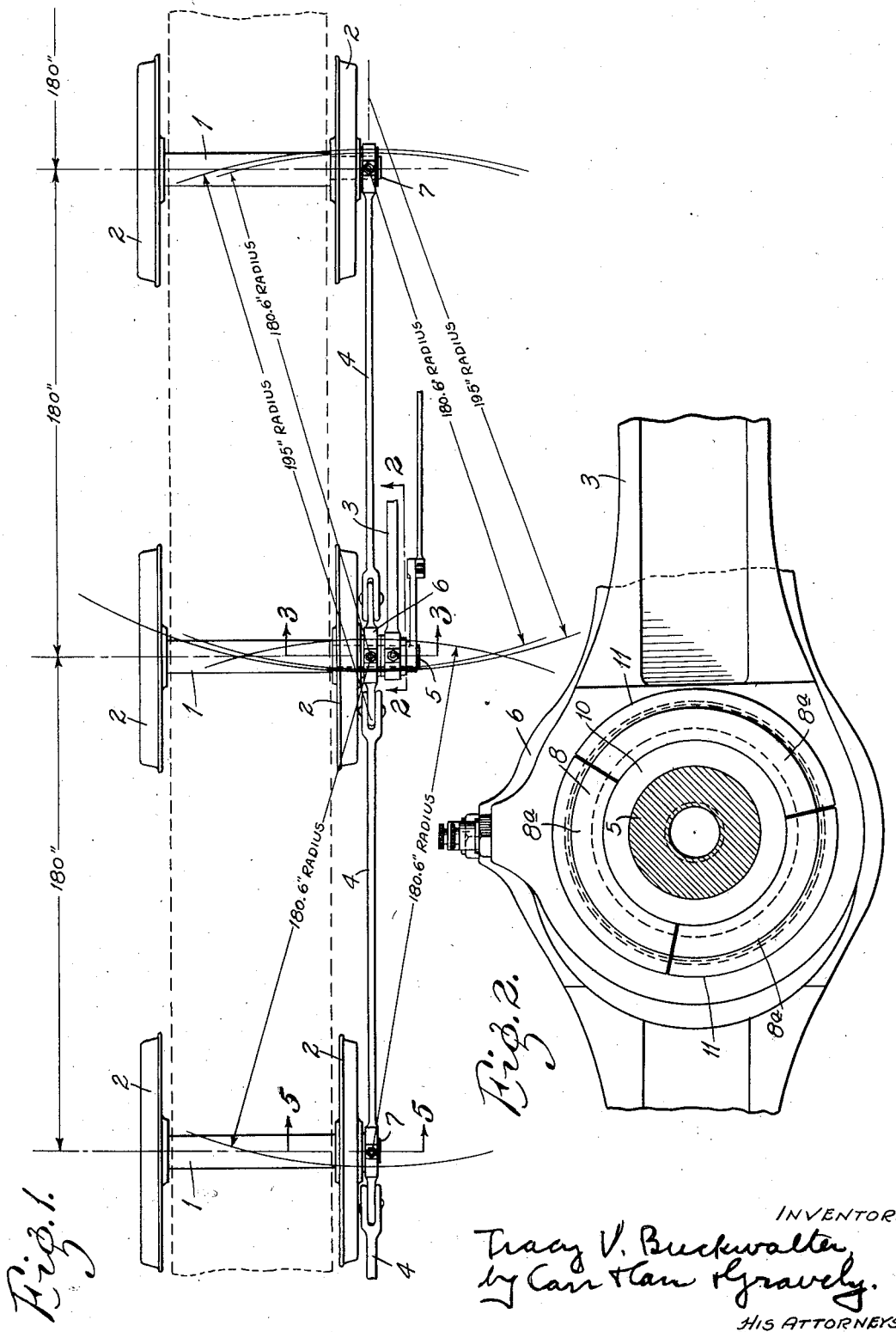
INVENTOR.
Tracy V. Buckwalter,
by Carr Carr & Gravely.
HIS ATTORNEYS.

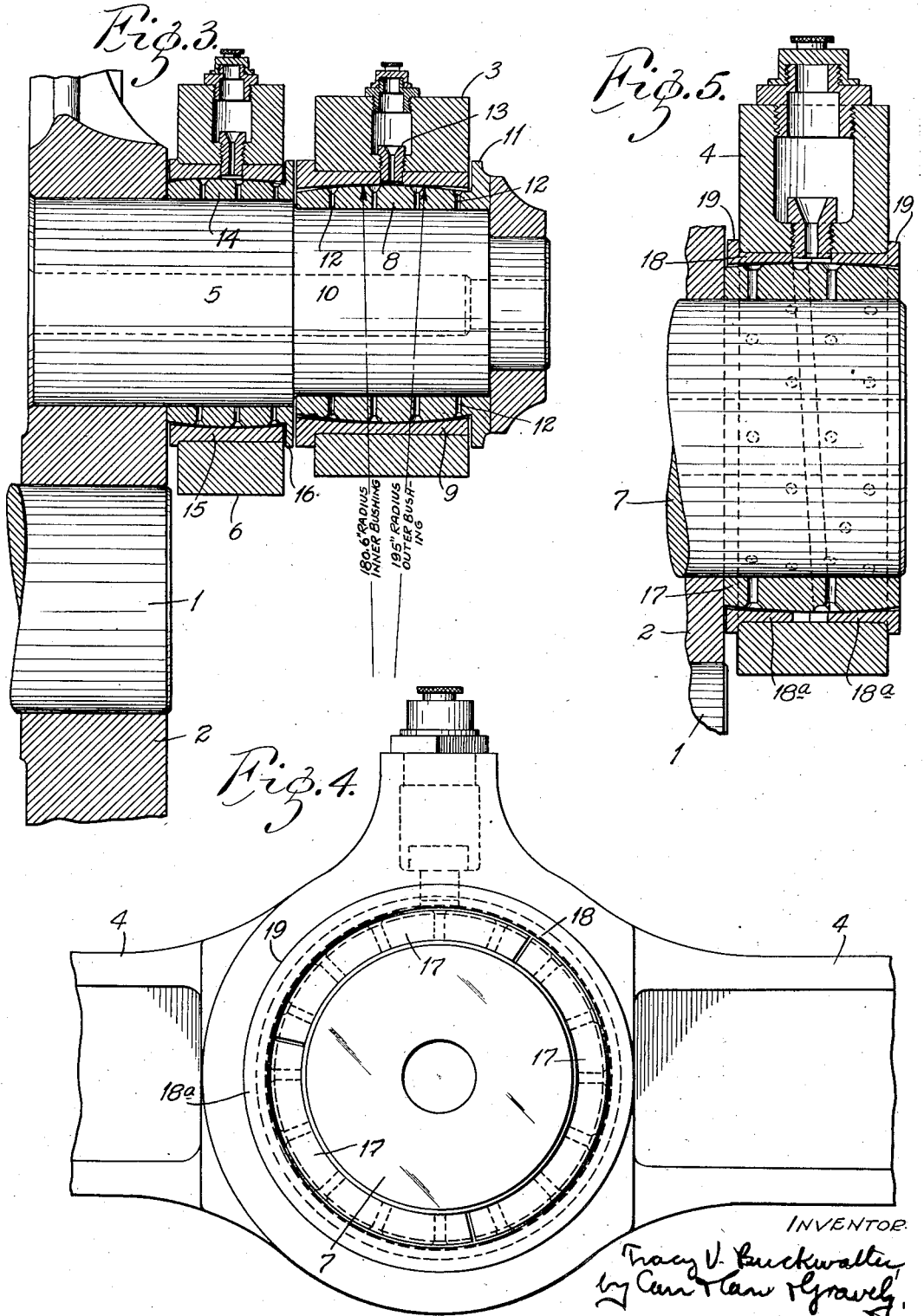

Patented Mar. 3, 1936

2,032,466

UNITED STATES PATENT OFFICE 2,032,466

LOCOMOTIVE ROD BEARING

Tracy V. Buckwalter, Canton, Ohio, assignor to The Timken Roller Bearing Company, Canton, Ohio, a corporation of Ohio Application June 1, 1931, Serial No. 541,384

3 Claims. (Cl. 308—72)

My invention relates to the bearings of locomotive drive rods and has for its principal object a construction that will withstand the very severe usage to which such bearings are subject. The invention consists principally in providing the bearing surfaces of such bearings with an endwise curvature whose center is located approximately at the other end of the rod from said bearing. The invention further consists in the locomotive rod bearing and in the parts and combinations and arrangements of parts hereinafter described and claimed.

In the accompanying drawings,

Fig. 1 is a diagrammatic plan view of three of the four axles of a locomotive truck, the main drive rod and side rods at one side only of the truck being illustrated, Fig. 2 is a sectional view on the line 2—2 of Fig. 1, Fig. 3 is a sectional view on the line 3—3 of Fig. 1, Fig. 4 is a side elevation of the main crank pin and associated parts, and Fig. 5 is a sectional view on the line 5—5 of Fig. 1.

The drawings illustrate three axles 1 of a four axle truck, with the wheels 2, main drive rod 3 and side rods 4. The main drive rod is rotatably mounted on the main crank pin 5 and the side drive rods 4 are pivotally connected to a bearing member 6 that is rotatably mounted on said main crank pin 5. The other ends of said side rods 4 are rotatably mounted on crank pins 7 of adjacent wheels.

The bearing of the main rod comprises an inner bearing member 8 of brass or other suitable material whose bearing surface is convexly curved endwise and an outer bearing sleeve 9 of steel or other suitable material whose bearing surface is concavely curved endwise. Said inner bearing member may be made of separate parts 8a as shown for convenience in assembly. The inner bearing member 8 is mounted on a reduced end portion 10 of the main crank pin and it has a peripheral flange 11 at its outer end that overlaps the outer bearing member. The inner bearing member 8 is provided with suitable lubricant grooves 12 and is supplied with lubricant by means of a lubricant cup 13 on said main rod that feeds through an opening in the outer bearing member 9. The radius of curvature of the inner bearing member is substantially the same as the distance from center to center of the side rods 4. As illustrated, the distance from the side rod bearing on the main crank pin 5 to the bearings at the other ends of said side rods 4 is 180 inches; and the radius of curvature of said inner bearing member 8 of said main rod bearing is 180.6 inches. The radius of curvature of the outer bearing member 9 may be the same as that of the inner member; or it may be somewhat greater. The drawings illustrate the radius of curvature of the outer bearing member as being approximately 195 inches. These dimensions, of course, would be different in trucks having different side rod lengths.

The side rod bearing on the main crank pin 5 comprises an innner bearing member 14 mounted against the wheel and an outer bearing member 15, said inner bearing member having an outer end flange 16 overlapping the end of said outer bearing member 15. The inner and outer bearing members 14 and 15 are curved endwise as previously described in connection with the main rod bearing. The ends of the outer bearing member 15 are spaced away from the wheel 2 and from the end flange 16 of the inner bearing member 14; and the outer bearing member 9 of the main rod bearing is spaced away from the inner bearing member 14 of the side rod bearing as well as from the end flange 11 of the main rod inner bearing member 8.

The bearings at the other ends of the side rods comprise convexly curved inner bearing members 17 mounted against the wheels 2 and concavely curved outer bearing members 18, the ends of said outer bearing members being spaced slightly away from the wheels. Each end of said outer bearing member has a flange 19 bearing against a side rod 4. Said member 18 may be in the form of separate rings 18a each with one end flange 19, said rings being easily inserted in the sides of the rods. The bearing members 17 or 18 will be curved endwise as hereinbefore described in connection with the other bearings.

By reason of the endwise curvature of the bearing members, relative movement of the parts is accommodated without causing heating and scoring of the bearing members. The use of the large radius of curvature and the location of the center of curvature of each bearing a considerable distance from the axis of the bearing, preferably at the center of the bearing at the opposite end of the rods is an important feature of the construction; since rocking movement of the truck parts is not accommodated either by cylindrical bearing members or by members having an endwise curvature of short radius.

What I claim is:

1. A plain bearing construction for the main rod and side rods of locomotive trucks in which the bearing surfaces of the inner and outer bearing members are provided with an endwise curvature whose radius is substantially the center to center length of said side rods, the radius of curvature of the outer bearing member being somewhat larger than that of the inner bearing member.

2. A locomotive rod plain bearing construction comprising an inner bearing member composed of a plurality of arcuate sections, and an outer bearing member, the bearing surfaces of said inner and outer members having an endwise curvature whose radius is substantially the length of said rod, the radius of curvature of said outer bearing member being somewhat greater than that of said inner bearing member.

3. A plain bearing construction for the main rod and side rods of locomotive trucks in which the bearing surfaces of the inner and outer bearing members are provided with an endwise curvature whose radius is substantially the center to center length of said side rods, the radius of curvature of the outer bearing member being somewhat larger than that of the inner bearing member, said inner bearing member having an end flange overlapping said outer bearing member but spaced therefrom.

TRACY V. BUCKWALTER.